United States Patent [19]

Kanesaki et al.

[11] Patent Number: 4,617,164

[45] Date of Patent: Oct. 14, 1986

[54] PROCESS FOR STRETCHING POLYESTER FILMS

[75] Inventors: Tateo Kanesaki, Nagahama; Shigeo Utsumi, Yokohama, all of Japan

[73] Assignee: Diafoil Company, Limited, Tokyo, Japan

[21] Appl. No.: 571,069

[22] Filed: Jan. 16, 1984

[30] Foreign Application Priority Data

Jan. 18, 1983 [JP] Japan .................................. 58-6030

[51] Int. Cl.$^4$ ............................................. B29C 55/14
[52] U.S. Cl. ............................... 264/235.8; 264/290.2
[58] Field of Search ........................... 264/290.2, 235.8

[56] References Cited

U.S. PATENT DOCUMENTS

| | | | |
|---|---|---|---|
| 2,968,065 | 1/1961 | Gronholz | 264/235.8 |
| 3,461,199 | 8/1969 | Campbell | 264/235.8 |
| 4,042,569 | 8/1977 | Bell et al. | 264/290.2 |
| 4,226,826 | 10/1980 | Motegi et al. | 264/235.8 |
| 4,230,658 | 10/1980 | Matsukura et al. | 264/235.8 |
| 4,234,532 | 11/1980 | Motegi et al. | 264/235.8 |
| 4,370,291 | 1/1983 | Kazama et al. | 264/290.2 |

FOREIGN PATENT DOCUMENTS

| | | | |
|---|---|---|---|
| 86302 | 8/1983 | European Pat. Off. | 264/290.2 |
| 2320118 | 11/1974 | Fed. Rep. of Germany | 264/290.2 |
| 54-34207 | 3/1979 | Japan | 264/290.2 |
| 56-3430 | 1/1981 | Japan | 264/290.2 |
| 57-64516 | 4/1982 | Japan | 264/290.2 |

*Primary Examiner*—James Lowe
*Attorney, Agent, or Firm*—Oblon, Fisher, Spivak, McClelland & Maier

[57] ABSTRACT

A process for preparing high tensile strength polyester film especially suitable for manufacturing magnetic recording tapes is disclosed. A raw polyester film is first stretched longitudinally so as to have an index of birefringence of 0.015–0.055, is then further stretched in the same direction at a temperature between 95° C. and 150° C. while the index of birefringence of the film is prevented from exceeding 0.080, is then stretched transversely to 2.5–5 times its width and is further stretched longitudinally and/or transversely to 1.1 times or greater. The product has high tensile strength as well as excellent flatness and slipperiness properties.

19 Claims, No Drawings

PROCESS FOR STRETCHING POLYESTER FILMS

BRIEF SUMMARY OF THE INVENTION

This invention relates to a process for preparing biaxially oriented polyester films. More specifically, this invention relates to a process for preparing high tensile strength polyester films comprising stretching a film longitudinally, stretching the longitudinally stretched film transversely, and again stretching the thus biaxially oriented film longitudinally and/or transversely.

BACKGROUND OF THE INVENTION

Biaxially stretched polyester films have excellent mechanical, thermal and electrical properties and chemical resistance, and are used in various fields. Particularly, they are rivaled by no other type of polymer films as the base film for magnetic recording tapes. The quality of base films for magnetic recording tapes has a great influence upon the quality of the final product magnetic tapes. Due to constant advances in the magnetic recording tape industry, there is increasing demand for base films of higher quality.

For instance, properties of magnetic recording tapes such as output, S/N ratio, dropout, generation of envelope are related to flatness of the base film, and the shape or appearance of a wound-up tape, and slidability and wear resistance are closely related to slipperiness of the base film. Therefore, polyester films provided with excellent flatness and slipperiness are required for production of magnetic recording tapes, especially those for video recording.

On the other hand, thinner magnetic recording tapes are desired, since magnetic recording apparatus is lightweight and more compact and has great capacity for longer periods of recording time. For such thin base films, polyester films with high longitudinal tensile strength have been used. These films are produced by stretching ordinary biaxially oriented films further longitudinally. As a larger variety of magnetic recording tape procuts are produced today, there is increasing demand for polyester films which have high strength, not only longitudinally but also transversely. That is, there has been a strong desire for base films with high biaxial strength as well as excellent flatness and slipperiness properties.

The conventional method for providing polyester films with good slipperiness properties is to roughen their surfaces with externally added or internally deposited fine particles. By this method, however, flatness of the film surface is impaired if the polyester film is produced under the conditions ordinarily employed today, and therefore it is not suitable for production of high quality magnetic recording tapes. Moreover, when a biaxially oriented film is further stretched longitudinally and/or transversely, there is a tendency for slidability characteristics to remarkably deteriorate, although the film surface does become flat. Thus, it has been considered that flatness and slipperiness of the film are incompatible characteristics, since it is difficult to obtain high strength films satisfactory in both properties.

We have conducted intensive research in order to obtain high strength polyester films excellent in flatness and slipperiness, and have found that the problem is solved by stretching a film longitudinally in multiple stages under conditions that restrict the degree of orientation, then stretching the thus obtained longitudinally stretched film transversely, and further stretching the thus obtained biaxially oriented film longitudinally and/or transversely.

DESCRIPTION OF THE PREFERRED EMBODIMENTS

This invention relates to a process for preparing polyester films suitable for use as the base film for high quality magnetic tapes. That is, this invention provides a process for preparing high strength polyester films comprising stretching an extruded and quenched polyester film (raw polyester film) longitudinally so that the index of birefringence of the film becomes 0.015–0.055 (this stage will, hereinafter, be called the first stretching stage), further stretching the film in the same direction at a temperature between 95° C. and 150° C. inclusive so that the index of birefringence, $\Delta n$, is prevented from exceeding 0.080 (this stage will, hereinafter, be called the second stretching stage), stretching the thus longitudinally stretched film transversely to 2.5–5 times its width, and finally stretching the thus biaxially stretched film longitudinally and/or transversely by at least 1.1 times.

By the index of birefringence ($\Delta n$) is meant the difference of the maximum value and the minimum value of the planar refractive indices of a film.

The polyester employed in the process of this invention is either a polyester at least 80% by weight of which comprises ethylene terephthalate units, and the remaining 20% by weight may comprise a comonomer or comonomers, or a blend of at least 80% by weight poly(ethylene terephthalate) and up to 20% by weight of another polymer or copolymer. The polyester can contain a stabilizer such as phosphoric acid, phosphorous acid or esters thereof; an additive such as titanium dioxide, fine silica or kaolin; or a lubricant, etc.

In the process of this invention, an extruded and quenched (raw) polyester film is first stretched longitudinally in one step or several steps so that $\Delta n$ becomes 0.015–0.055, preferably 0.025–0.055. When $\Delta n$ is less than 0.025, orientation-crystallization of polyester films hardly occurs although flat and slippery films can be obtained. Therefore, there is a tendency for the films to stick to the drawing rolls in the later longitudinal stretching stage. If sticking occurs, it not only makes it impossible to carry out uniform longitudinal stretching but also causes formation of irregular wart-like protuberances in the portions where sticking has occurred. Such surface defects make the stretched films unsuitable as magnetic tape bases.

When the $\Delta n$ value of a polyester film which has undergone the first stage stretching is less than 0.015, not only sticking occurs but the uniformity in the thickness of the film is abated, and thus films suitable for magnetic recording tapes cannot be produced. When $\Delta n$ of a polyester film which has undergone the first stage stretching is 0.015 or more, even if it is less than 0.025, the uniformity in the thickness is satisfactory. A film good for use in manufacturing magnetic recording tapes can be produced therefrom, if the sticking is prevented by some means in the course of stretching. This can be effected by the employment of drawing rolls with special non-sticking surface finish instead of ordinary rolls, although it is not desirable to use such rolls since special care is required for the protection of the surface.

Naturally, when $\Delta n$ of a film which has undergone the first stage stretching is 0.025 or more, the thickness of the film is very uniform and sticking does not occur, and therefore a film good for manufacturing magnetic recording tapes can be produced with ease.

If Δn is greater than 0.055, longitudinal irregularities in thickness will develop in the film in the later longitudinal stretching stage, and the flatness of the biaxially stretched films will be insufficient.

The first longitudinal stretching stage, in which Δn is 0.015–0.055, is preferably done in one to three stretching steps. The temperature in the first stretching stage is preferably 85°–110° C., and more preferably 85°–120° C.

The ratio of stretching at the first stretching stage is 2.0–4.0 times the original length in the case of one-step stretching, although it differs depending upon the stretching temperature. In the case of two- or three-step stretching, a higher ratio of stretching can be employed if an intermediate heat treatment for relaxation of orientation is interposed. The orientation relaxation heat treatment can be effected by heating for a short time at a temperature higher than the stretching temperature and lower than the temperature at which crystallization begins.

Thus, longitudinally stretched films having a Δn of 0.015–0.055 are obtained in the first stage of longitudinal stretching. These films are further stretched longitudinally at a temperature of 95°–150° C. in the second stage while retaining Δn at or under 0.080. If the second stage longitudinal stretching is carried out at a temperature lower than 95° C., the stretched film has insufficient flatness and slipperiness. If it is carried out at a temperature higher than 150° C., crystallization progresses excessively and transverse stretching is impaired. Further, it is very important to carry out stretching in the second stretching stage so that Δn does not exceed 0.08. This is a considerably small value in light of ordinary film-making techniques, especially in the field of manufacturing films for magnetic recording tapes. By holding Δn to such a low value, longitudinal orientation can be controlled. If the Δn value is greater than 0.080, the flatness of the biaxially stretched film is insufficient. If the value is far greater than that, longitudinal splitting of the film is highly apt to occur in transverse stretching. The ratio of stretching in the second stage stretching is 1.05–1.7, preferably 1.1–1.6. The second stage stretching is usually effected as the last step of longitudinal stretching, preferably in one step in a short period of time.

The thus longitudinally stretched film is subjected to transverse stretching at a temperature between 80° C. and 160° C., wherein the film is tentered to 2.5–5 times, preferably 3–4.5 times its original width. The transversely stretched film is heat-set at 100°–200° C. and thus a biaxially oriented film is obtained.

The thus obtained biaxially oriented film is provided with characteristic surface properties, which are not exhibited by the films obtained by the conventional film making technique. When a raw film contains particles (externally added particles or internally deposited particles, including residual particles of the used catalyst), the film manufactured in accordance with this invention has protuberances which are each accompanied by a recess among the protuberances formed. The proportion of protuberances having recesses therearound to the total protuberances existing on the surface of the film is dependent upon film-making conditions. According to this invention, films having protuberances each accompanied by a recess therearound in a proportion of at least 5% can be manufactured.

The biaxially oriented film is further stretched longitudinally and/or transversely. A large variety of magnetic recording tape products are manufactured today, and the strength required of base films varies in accordance with the intended use. However, for high tensile strength films, it is preferred that the tensile force required for 5% elongation $F_5$ value in either longitudinal or transverse direction be 13 kg/mm$^2$ or more. In order to provide a film with an $F_5$ value of at least 13 kg/mm$^2$ in the longitudinal direction, it is required to restretch the film at least 1.1 times in the longitudinal direction at a temperature of 100°–200° C. In order to provide a film with $F_5$ values of not less than 13 kg/mm$^2$ in the longitudinal and transverse directions, the film is first stretched longitudinally by at least 1.1 times, preferably 1.2 times or more, at the above-mentioned temperature, and then is stretched transversely by 1.1 times or more in width. It is possible for the film to be simultaneously stretched longitudinally and transversely by 1.1 times or more. The ratio of the restretching is 1.1–1.7, preferably 1.2–1.5.

After restretching, the film is finally subjected to heat setting at a temperature between 170° C. and 240° C. If biaxially oriented films prepared by the conventional film-making process are restretched, the films are flattened and show remarkable deterioration in slidability. In accordance with the process of this invention, however, the deterioration in slipperiness by restretching is extremely small. Therefore, high tensile strength films for magnetic recording tapes having excellent flatness and slipperiness can be provided.

Now the invention will be illustrated by way of working examples. The methods employed for measuring the various properties of the films are as follows:

(1) Friction Coefficient ($\mu$)

A strip of a film was brought into contact with the surface of a hard chromium-plated roll having a diameter of 6 mm and a surface finish of 2.0 S over an arc of 135° C. ($\theta$). A load ($T_2$) of 53 g was applied to one end thereof, and the strip was allowed to slide over the surface of the roll at the rate of 1 m/min and the supporting force ($T_1$(g)) on the other end of the strip was measured. The kinetic friction coefficient ($\mu$) was determined in accordance with the following equation.

$$\mu = \frac{1}{\theta} \ln\left(\frac{T_1}{T_2}\right) = 0.424 \ln\left(\frac{T_1}{53}\right)$$

(2) Center Line Average Roughness ($R_a$)

Surface roughness was measured using a surface roughness measuring apparatus SE-3FK manufactured by Kosaka Kenkyusho as explained below. The radius of curvature of the tip of the contact needle was 0.5$\mu$ and the needle pressure was 30 mg. Center line average value of surface roughness $R_a$ was determined in accordance with the procedure prescribed in JIS (Japanese Industrial Standards) B0601. The standard length L (2.5 mm of the film) is taken from the film profile curve along the center line. The center line of the portion is taken on an abscissa and the roughness is taken on an ordinate. Then the roughness curve is expressed as $y = f(x)$. The $R_a$ value was obtained as an average of 5 points along the longitudinal line and 5 points along the transverse line. Waves longer than 80 μm were cut off. $R_a$ is given in μm as:

$$\frac{1}{L} \int_0^L |f(x)| \, dx$$

(3) Intrinsic Viscosity ([η])

To 200 mg of a sample, 20 ml of phenol/tetrachloroethane (50:50 by weight) was added and the sample was dissolved by heating at 110° C. for one hour. The viscosity of the solution was measured at 30° C.

(4) Index of Birefringence (Δn)

Retardation (R) was measured using a Carl Zeiss polarization microscope, and index of birefringence was calculated in accordance with the following equation.

$$\Delta n = R/d,$$

wherein
R: retardation
d: thickness of film

(5) Temperature of Film

Temperature of portions of films being stretched was measured using an IR radiation thermometer made by Burns Engineering Company.

(6) Surface Defects Caused by Sticking

The surface of the films was coated with evaporated aluminum and was observed by a Carl Zeiss differential interference microscope. Films having defects are indicated by x and those without defects are indicated by o.

(7) Observation of Surface Protuberances (Checking for Protuberances Having a Recess Around Them)

Surface protuberances were observed in the same way as described under the above (6). The proportion of protuberances having a recess around them (P) is defined as follows.

$$P = \frac{\text{Number of protuberances with a recess around them}}{\text{Total number of protuberances}} \times 100(\%)$$

(8) $F_5$ Value

Specimens ½ inch in width and 50 mm in length (length between chucks) were drawn by a tensile tester, Tensilon UTN-III, made by Toyo Measuring Instrument Co., Ltd. at the rate of 50 mm/min in an environment of 20° C. and 65% RH. The measured 5% off-set load was divided by the initial cross-sectional area and the value is given in kg/mm².

EXAMPLE 1

(Preparation of Polyester)

One hundred (100) parts by weight dimethyl terephthalate, 70 parts by weight ethyleneglycol, 0.10 part by weight calcium acetate monohydrate and 0.17 part by weight lithium acetate dihydrate were placed in a reactor and were heated. As the temperature rose, ester interchange proceeded and methanol was distilled away. After about 4 hours, the temperature reached 230° C. and the ester interchange reaction was substantially completed.

Triethyl phosphate (0.35 parts by weight) was added to the reaction product, and further 0.05 parts by weight antimony trioxide was added as a condensation polymerization catalyst. Thus the reaction product was polymerized into a polyester by the conventional process. A number of uniformly dispersed deposited fine particles, 0.5–1μ in particle size, including particles containing calcium and lithium and elemental phosphorus, were observed in the polyester. The intrinsic viscosity of this polyester was 0.65.

A polyester without these particles was prepared separately and was mixed with the above-described polyester at a ratio of 1:1 by weight, and the mixture was used for making films.

(Film Making)

The polyester was melted and extruded into a film, which was quenched. The obtained raw film ([η]=0.62) was stretched first longitudinally by two roll pairs, rotating at different speeds at 85° C. (measured by an infrared radiation thermometer), 1.9–2.5 times in length and was further stretched in the same direction by 1.1–1.7 times at 110° C. Then the film was stretched transversely a tenter by 3.5 times in width at 140° C. and the film was heat-set at 150° C. The thus obtained biaxially oriented film was further stretched longitudinally by the rotation speed difference of two roll pairs by 1.2–1.3 times and was finally heat-set at 200° C. Samples No. 1–4 (all 15μ in thickness) were prepared as described above. Sample No. 5 (15μ in thickness) was prepared by the conventional process. That is, a raw film ([η]=0.62) was stretched longitudinally 3.7 times in length at 90° C., then was stretched transversely 3.5 times in width at 110° C. and was finally heat-set at 150° C. Then the film was further stretched longitudinally 1.1 times at 130° C. and was heat-set at 200° C. The film-making conditions and properties of each sample are indicated in Table 1. Only Sample No. 3, which was prepared in accordance with the process of this invention, had an $F_5$ value in excess of 14 kg/mm² and had excellent flatness and slipperiness properties.

EXAMPLE 2

A raw film ([η]=0.62) was prepared from the same polyester material as described in Example 1. This film was stretched longitudinally by 2.3 times at 85° C., and further stretched in the same direction by 1.3 times at 110° C. Thereafter, the stretched film was stretched transversely 3.5 times in width at 140° C. and heat-set at 150° C. The thus obtained biaxially oriented film was further stretched longitudinally by 1.3 times at 130° C. and stretched transversely 1.15 times in width at 140° C. and was finally heat-set at 200° C. Thus Sample No. 6 (15μ in thickness) was obtained.

Separately Sample No. 7 (15μ in thickness) was obtained as an example of a film produced by the conventional process. That is, first the raw film was stretched longitudinally by 3.7 times at 90° C., and then was stretched transversely by 3.5 times at 110° C. and heat-set at 150° C. Then the thus biaxially stretched film was further stretched longitudinally by 1.1 times at 130° C. and stretched transversely by 1.18 times at 140° C. and finally heat-set at 200° C. The film-making conditions and properties of these samples are also shown in Table 1. Comparison of Sample No. 6 and No. 7 shows excel-

TABLE 1

| Sample No. | Ratio of longitudinal stretching 1st stage | Ratio of longitudinal stretching 2nd stage | Δn of longitudinally stretched film 1st stage | Δn of longitudinally stretched film 2nd stage | Ratio of longitudinal restretching | Ratio of transverse restretching | P (%)[1] | Surface[1] defect caused by sticking | Finished film* Ra (μ) | Finished film* μ | $F_5$ (kg/mm²) Longitudinal | $F_5$ (kg/mm²) Transverse | Remarks |
|---|---|---|---|---|---|---|---|---|---|---|---|---|---|
| 1 | 1.9 | 1.7 | 0.023 | 0.065 | 1.3 | — | 20 | X[2] | — | — | 14.1 | 11.0 | This invention |
| 2 | 2.1 | 1.7 | 0.032 | 0.083 | 1.2 | — | 5 | O | 0.020 | 0.32 | 14.2 | 11.2 | Comparative example |
| 3 | 2.3 | 1.3 | 0.040 | 0.065 | 1.3 | — | 20 | O | 0.016 | 0.29 | 14.2 | 11.0 | This invention |
| 4 | 2.5 | 1.1 | 0.058 | 0.065 | 1.3 | — | 5 | O | 0.019 | 0.33 | 14.0 | 11.3 | Comparative example |
| 5 | 3.7 | — | 0.105 | — | 1.1 | — | 0 | O | 0.016 | 0.36 | 14.2 | 11.1 | Comparative example |
| 6 | 2.3 | 1.3 | 0.040 | 0.065 | 1.3 | 1.15 | 20 | O | 0.015 | 0.30 | 13.2 | 13.1 | This invention |
| 7 | 3.7 | — | 0.105 | — | 1.1 | 1.18 | 0 | O | 0.015 | 0.38 | 13.0 | 13.1 | Comparative example |

[1]Biaxially oriented film before restretching
[2]Although the surface defect was observed, the film was satisfactory in slipperiness.

We claim:

1. A process for preparing a substantially flat polyester film which exhibits improved low friction characteristics comprising:
    stretching an extruded, substantially unstretched and quenched raw polyester film, first, longitudinally so that an index of birefringence Δn of 0.015–0.055 is attained, stretching it further in the same direction at a temperature between 95° C. and 150° C. inclusive while preventing Δn value from exceeding 0.080, stretching the film transversely to 2.5–5 times its original width and further stretching the film in at least one of the longitudinal or transverse directions by at least 1.1 times.

2. The process of claim 1, wherein a Δn of 0.025–0.055 is attained in the first longitudinal stretching stage.

3. The process of claim 1, wherein the first stage longitudinal stretching is carried out in 1 to 3 steps.

4. The process of claim 3, wherein the first stage longitudinal stretching is carried out in one step.

5. The process of claim 4, wherein the first stage longitudinal stretching is carried out in 2 to 3 steps with a intermediate heating step or steps for relaxation of orientation interposed.

6. The process of claim 1, wherein the first stage longitudinal stretching is carried out at a temperature between 80° C. and 120° C.

7. The process of claim 6, wherein the first stage longitudinal stretching is carried out at a temperature between 85° C. and 110° C.

8. The process of claim 1, wherein the film is stretched to 2.0–4.0 times in length at the first stage longitudinal stretching.

9. The process of claim 1, wherein the ratio of stretching in the second stage longitudinal stretching is 1.05–1.7.

10. The process of claim 9, wherein the ratio of stretching in the second longitudinal stretching is 1.1–1.6.

11. The process of claim 1, wherein the second stage longitudinal stretching is carried out in one step.

12. The process of claim 1, wherein the first transverse stretching is carried out such that the film is stretched to 3–4.5 times its original width.

13. The process of claim 1, wherein heat-setting of the biaxially stretched film is carried out at 100°–120° C.

14. The process of claim 1, wherein the restretching is carried out longitudinally at a temperature between 100° C. and 200° C. inclusive so that the film is stretched 1.1 times or greater.

15. The process of claim 1, wherein the restretching is carried out by first stretching the biaxially oriented film longitudinally 1.1 times or greater and then stretching it transversely 1.1 times or greater.

16. The process of claim 15, wherein the longitudinal stretching is carried out so that the film is stretched 1.2 times or greater.

17. The process of claim 1, wherein the restretching ratio is 1.1–1.7.

18. The process of claim 16, wherein the restretching ratio is 1.2–1.5.

19. The process of claim 1, wherein a final heat-setting is carried out at 170°–240° C.

* * * * *